United States Patent [19]
Kotowski et al.

[11] Patent Number: 4,782,809
[45] Date of Patent: Nov. 8, 1988

[54] FUEL INJECTOR WITH ELECTRONIC CONTROL CIRCUIT

[75] Inventors: Jeffrey P. Kotowski; Jeffrey T. Barylak, both of Palatine, Ill.

[73] Assignee: Motorola, Inc., Schaumburg, Ill.

[21] Appl. No.: 123,447

[22] Filed: Nov. 19, 1987

[51] Int. Cl.$^4$ ............................................. F02M 67/02
[52] U.S. Cl. ..................................... 123/531; 239/89
[58] Field of Search ............... 123/531, 532, 533, 534, 123/535, 445, 457, 458, 472, 478; 239/90, 5, 89

[56] References Cited

U.S. PATENT DOCUMENTS

| | | | |
|---|---|---|---|
| 3,828,247 | 8/1974 | Kirsch et al. | 324/28 R |
| 4,235,374 | 11/1980 | Walter et al. | 239/90 |
| 4,281,792 | 8/1981 | Sisson et al. | 239/5 |
| 4,381,077 | 4/1983 | Tsumura et al. | 123/531 |
| 4,561,405 | 12/1985 | Simons | 123/531 |
| 4,589,401 | 5/1986 | Karim et al. | 123/479 |
| 4,693,224 | 9/1987 | McKay | 123/531 |

OTHER PUBLICATIONS

"Pneumatic Fuel Injection Spurs Two-Stroke Revival" from Automotive Engineering, Aug. 1986, pp. 74–79.
"Development of Engine Control System Through the Use of Microcomputer" by Kobashi, Funato and Aoki, from SAE Tech. Paper Art., pp. 4–6 dated Sep. 23–26, 1985.
"Two-Stroke Revolution Brews in the Land Down Under" by Lance Ealey, from Automotive Industries, Jul. 1986, pp. 28, 29.
"Orbital, Ford Agree to Develop Auto 2-Stroke" from Ward's Engine Update, Sep. 15, 1986, title page and p. 7.
"Orbital Flight" from Newsline, no date, title page.
"A Blend of Related Technologies" by Pedr Davis, from Automotive News, Jul. 27, 1987, title page.
"1988 Cars–What's Hot in High-Tech" by General Motors, from Automotive News, Oct. 5, 1987, pp. E20, E22.

*Primary Examiner*—Raymond A. Nelli
*Attorney, Agent, or Firm*—Phillip H. Melamed

[57] ABSTRACT

A fixed volume receiving cavity (18) of a fuel injector (11) receives fuel from a fuel inlet valve means (23, 24) in accordance with the time duration($T_A$) of fuel metering control signal pulses (100). Injection occurrence control signal pulses (b 101) actuate a compressed air inlet valve means (26–30) connected to the cavity to inject the contents of the cavity through an outlet valve (20) and into a combustion chamber (15) of an engine. The fuel metering pulses (100) are developed by a microprocessor (50). Circuitry (53–66; 70–79,66) separate from and external to the microprocessor receives the fuel metering control signal pulses and provides, in response thereto, the fuel injection occurrence control signal pulses. Use of a fixed volume receiving cavity in the injector, in combination with the time-controlled fuel inlet valve means, eliminates many mechanical likages required in most prior injectors. Deriving the fuel injection occurrence signal pulses from the fuel metering signal pulses allows the microprocessor to produce only a single output signal (Y) to implement fuel injection control.

20 Claims, 3 Drawing Sheets

FUEL INJECTOR WITH ELECTRONIC CONTROL CIRCUIT

BACKGROUND OF THE INVENTION

The present invention relates to the field of fuel injection for an internal combustion engine, and more particularly to an improved fuel injector with an improved electronic control circuit for use in delivering fuel to a combustion chamber of an internal combustion engine.

Typically, internal combustion engines receive a mixture of vaporized fuel and air from a carburetor which controls the proper ratio of the air-fuel mixture. However, properly delivering this air-fuel vapor mixture to individual cylinder combustion chambers of the engine can present problems. Also, such systems have difficulty in maintaining the proper air-fuel vapor mixture, especially at extremely high or low temperatures. To avoid some of these problems, some prior fuel control systems have utilized direct liquid fuel injection into the engine cylinder combustion chamber. While these systems generally provide improved engine performance, they may not provide efficient fuel combustion. In addition, typically controlling the amount of liquid fuel injection and the time of occurrence of the fuel injection in such systems has been extremely complex and dependent upon a large number of mechanical linkages. These linkages, in time, tend to wear and thereby degrade engine performance.

The electronic control circuits for prior fuel injection systems, such as those discussed above, are generally microprocessor controlled. Typically a microprocessor produces one signal for controlling the amount of fuel to be injected and a separate additional signal for controlling when the fuel is to be injected for direct fuel injection. Some systems produce a single control signal for controlling both the magnitude of fuel injection and its time occurrence. However, these systems typically rely on many mechanical linkages to properly implement fuel injection in response to such a single control signal, and, therefore, these systems are not very accurate and are subject to mechanical wear.

A new fuel injection system has been proposed wherein liquid fuel is injected into the engine cylinder through the use of compressed air forcing an air and fuel mixture through a spray nozzle. While this has resulted in partial atomization of the liquid fuel to obtain improved combustion, a complex mechanical configuration is utilized to control the amount of fuel to be injected. In addition, it appears that the control circuit for such a system would apparently require a microprocessor to provide a large number of separate fuel amount and fuel injection occurrence control signals for controlling each injector utilized in such a system. Since the microprocessor must produce a large number of fuel injection control output signals, this therefore limits other engine control functions which could be accomplished by the microprocessor.

SUMMARY OF THE INVENTION

An object of the present invention is to provide an improved fuel injector, an improved fuel injector control circuit and an improved fuel injection system which overcome the aforementioned deficiencies.

A more particular object of the present invention is to provide an improved fuel injector in which accurate control of the amount of fuel to be injected is provided without requiring a large number of mechanically movable parts.

Another specific object of the present invention is to provide an improved fuel injector control circuit in which the number of output control signals produced by a primary fuel injector control circuit, preferably a microprocessor, is minimized.

A still further specific object of the present invention is to provide a fuel injection system utilizing the improved fuel injector and the improved fuel injector control circuit of the present invention.

In one embodiment of the present invention, an improved fuel injector is provided. The fuel injector comprises a body having a fixed volume receiving cavity with an outlet valve, the outlet valve adaptable to selectively inject the contents in the cavity into an engine combustion chamber; a fuel inlet valve means connected to the cavity for periodically providing fuel thereto in accordance with a received fuel metering electrical control signal, comprising periodic pulses. This metering signal controls actuation of the fuel inlet valve means, and the effective duration of the fuel metering signal pulses control the amount of fuel provided to the cavity. A compressed air inlet valve means is connected to the cavity for periodically providing compressed air to the cavity in accordance with a received injection occurrence electrical control signal, separate from said fuel metering signal. The injection occurrence signal comprises periodic pulses which control actuation of the compressed air inlet valve means and which control at least the initial time occurrence of the injection of the contents of the cavity, comprising fuel and air, through the outlet valve and into the combustion chamber.

An embodiment of the present invention also provides an improved fuel injection control circuit. The control circuit comprises: means for developing a fuel metering electrical control signal comprising periodic pulses having pulse durations determining the amount of fuel to be stored in a storage cavity of a fuel injector; and means for developing a fuel injection occurrence electrical control signal, separate from the fuel metering control signal, comprising periodic pulses corresponding to said fuel metering control signal pulses, each of said fuel injection occurrence pulses having an initial time occurrence determining the initial occurrence of injection of the contents in said injector storage cavity into a combustion chamber. The fuel injection occurrence control signal developing means is separate from and coupled to said fuel metering signal developing means and receives the fuel metering control signal and determines the fuel injection occurrence control signal in accordance therewith.

An aspect of the present invention contemplates the use of an improved fuel injector which has an electrically-controlled fuel inlet valve and a separate electrically-controlled compressed air inlet valve. Both of these valves connect to a fixed volume receiving or storage cavity in the fuel injector, and the contents of this cavity are periodically provided, via an outlet valve, to an engine combustion chamber, such as a cylinder combustion chamber in a conventional internal combustion engine. The amount of fuel provided in the receiving cavity is determined in accordance with the duration of fuel metering signal pulses which determine the percentage of the fixed volume of the storage cavity that is to be filled with fuel. Fuel injection occurs by virtue of the compressed air inlet valve being opened in accordance with fuel injection occurrence electrical control signal pulses which are separate from the fuel metering signal pulses. According to an additional aspect of the present invention, the fuel injection occurrence signal pulses are produced by circuitry which receives the fuel metering signal pulses.

Essentially, the improved fuel injector of the present invention has a fixed volume fuel receiving cavity. Separate fuel inlet and air inlet valves are used to control the amount of fuel and air in the receiving cavity and the occurrence of fuel injection. Fuel injection occurs when the air inlet valve is opened resulting in compressed air forcing the contents of the storage cavity, comprising the previously-stored fuel and the compressed air, to be forced through a fuel injection outlet valve into the engine combustion chamber. By having the amount of fuel in the storage cavity determined by the duration of actuation of the fuel inlet valve, rather than by altering the volume of the fuel receiving cavity and then completely filling the variable volume cavity with fuel, a simpler and less mechanically dependent fuel injector is provided. Also, determining the amount of fuel to be injected as a function of the timed duration opening of a valve, rather than as a function of the volume of a variable volume chamber, results in being able to more accurately provide a desired amount of fuel for injection.

The fuel injector control circuit of the present invention allows a microprocessor to develop a fuel metering electrical control signal, and then utilizes separate and additional external circuitry to develop a separate fuel injection occurrence control signal. In this manner, the number of electrical control signals required of the microprocessor is minimized. Such a control circuit is readily combinable with the improved fuel injector of the present invention to provide an improved fuel injection system.

BRIEF DESCRIPTION OF THE DRAWINGS

For a more complete understanding of the present invention, reference should be made to the drawings in which.

DESCRIPTION OF THE PREFERRED EMBODIMENTS OF THE INVENTION

Figure 1:
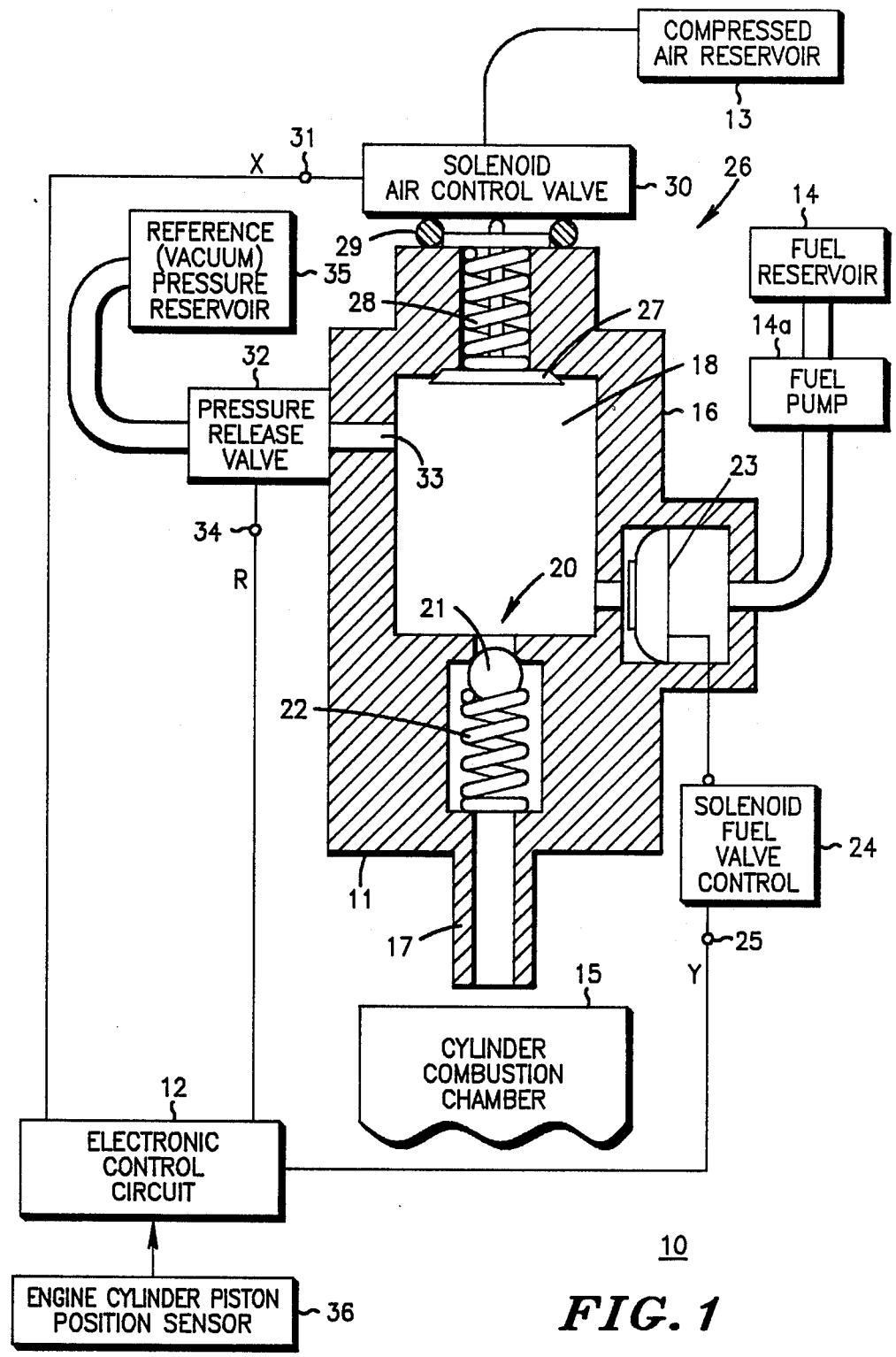
FIG. 1 is a combined cross-section and schematic diagram of a fuel injection system in which the improved fuel injector of the present invention is illustrated substantially in cross-section.

Referring to FIG. 1, a fuel injection system 10 constructed in accordance with the present invention is illustrated. The system 10 comprises an improved fuel injector 11, an electronic control circuit 12 for the fuel injector 11, a compressed air reservoir 13, a fuel reservoir 14, a fuel pump 14a, and a cylinder combustion chamber 15. The chamber 15 corresponds to the combustion chamber of an individual cylinder of a conventional gasoline internal combustion engine (not shown). Essentially, the fuel injection system 10 provides an electronically controlled mixture of air and fuel to the combustion chamber of the internal combustion engine. This is accomplished in an advantageous manner such that more efficient fuel combustion is achieved while the mechanical complexity of the fuel injector 11 is reduced and its accuracy in providing a proper air-fuel mixture to the engine is increased. In addition, the complexity of the electronic control circuit 12 is reduced.

The fuel injector 11 is shown in FIG. 1 in a combined cross-sectional and schematic manner and comprises a housing or main body 16 having an outlet extension 17 which is intended to be connected to the cylinder combustion chamber 15 shown directly below the extension 17. An air-fuel mixture will be provided by the injector 11 via the extension 17 to the combustion chamber 15. It is contemplated that conventional spark ignition will then occur to ignite the air-fuel mixture in the cylinder chamber 15. The function of the fuel injection system 10 is to provide an accurate and reliable air-fuel mixture to the engine combustion chamber 15.

Figure 4:
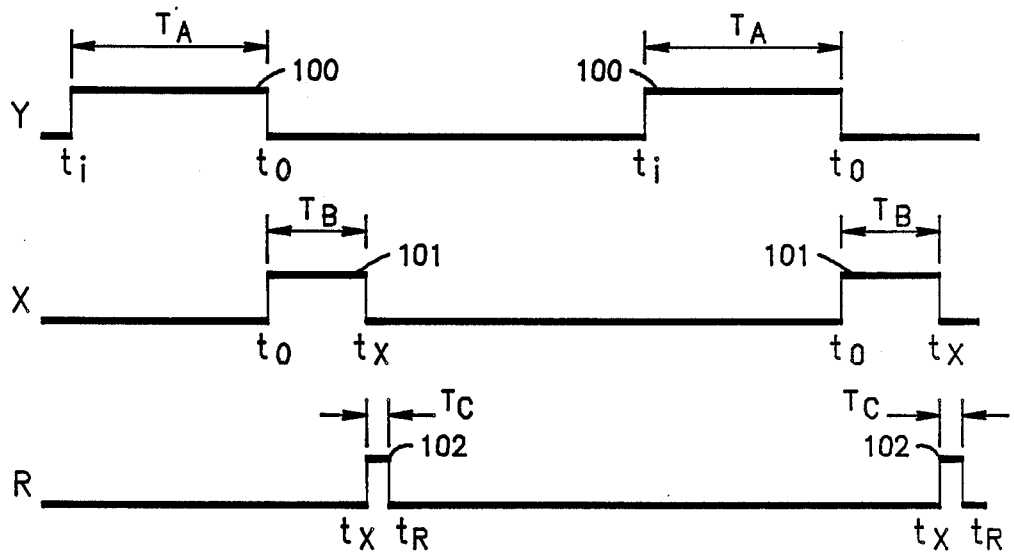
FIG. 4 comprises a series of graphs illustrating the waveforms of various signals produced by the control circuits shown in FIGS. 2 and 3.

The injector has an internal receiving or storage cavity 18 in which first liquid fuel, such as gasoline, will be periodically stored therein, and subsequently compressed air will periodically force the stored fuel and air through the outlet extension 17 into the combustion chamber 15. The receiving or storage cavity 18 essentially has a fixed volume and receives fuel to be stored therein. An outlet valve, indicated by reference number 20, is provided in the injector 11 and comprises a ball valve assembly including a ball 21 and a spring 22. A fuel inlet valve 23 is also in the injector 11 and is controlled by a solenoid fuel valve control 24. The fuel inlet valve 23 essentially selectively connects the fuel reservoir 14, via the fuel pump 14a, to the fixed volume storage cavity 18 in accordance with a fuel metering electrical signal Y provided by the electronic control circuit 12 to a control terminal 25 of the solenoid fuel valve control 24. A typical waveform of the electrical signal Y is shown in FIG. 4 which illustrates that the signal Y comprises periodic pulses 100 having durations $T_A$ determined by the electronic control circuit 12. The pulses 100 start at times $t_i$ and terminate at times $t_o$ which times correspond to predetermined positions of pistons associated with the engine cylinder having chamber 15 which receives fuel from the injector 11. Essentially, during the pulse duration $T_A$, the fuel inlet valve 23 will open, and therefore the duration of the pulses 100 will control the amount of fuel passed from the fuel reservoir 14 into the storage chamber 18. During the passage of this fuel, it is contemplated that the storage chamber 18 will be substantially closed, with the outlet valve 20 being closed and therefore not allowing fuel injection during the filling of the cavity 18 by the fuel inlet valve 23.

The fuel injector 11 also includes a compressed air inlet valve assembly generally designated by the reference numeral 26. This assembly comprises an inlet plunger valve 27, a bias spring 28 tending to keep the plunger valve 27 closed, a sealing O-ring 29, a solenoid air control valve 30 for controlling movement of the plunger valve 27 and a control terminal 31 of the solenoid air control valve 30. The compressed air reservoir 13 is connected to the solenoid control valve 30. During actuation of the solenoid control valve 30, compressed air will pass from the air reservoir 1 3 through the solenoid control valve 30 so as to force open the plunge valve 27 against the action of the spring 28. It is contemplated that the compressed air will have a pressure of 100 PSI (pounds per square inch), and that this pressure, when it results in opening the plunger valve 27, will be sufficient to force the contents in the storage cavity 17, which will contain the fuel provided by the fuel inlet valve 23 and the compressed air provided by the solenoid air control valve 30, into the outlet extension 17 by virtue of actuating the outlet ball valve assembly 20 comprising the ball 21 and spring 22. In other words, when the solenoid air control valve 30 is actuated, compressed air will open the plunger 27, effectively actuate the outlet valve 20 and force the contents of the storage cavity 18 into the engine combustion chamber 15.

Actuation of the solenoid air control valve 30 occurs in response to a received fuel injection occurrence control signal X provided at the terminal 31. The control signal X comprises periodic pulses 101 of predetermined durations. FIG. 4 illustrates a typical waveform for the electrical control signal X provided at the terminal 31. It should be noted that the control signal X preferably commences a high logic state, corresponding to solenoid air control valve actuation, at the time $t_0$, and it remains high for a duration $T_B$, until a subsequent time $t_x$. During $T_B$, the contents of the storage cavity 18 is forced into the combustion chamber 15 for subsequent ignition and combustion. After $t_x$, the valve 30 will close and the plunger valve 27 will close due to spring 28 until the next time to.

The fuel injector 11 also includes a solenoid controlled pressure release valve 32 connected by a conduit 33 to the storage cavity 18 and including a control terminal 34 at which a release signal R is provided which consists of periodic short duration pulses 102. The pressure release valve 32 is also connected to a reference (vacuum) reservoir 35. FIG. 4 illustrates typical waveforms for the release signal R. The short duration pulses 102 commence at the times $t_X$ and terminate shortly thereafter at times $t_r$. It should be noted that preferably the pulses which comprise the fuel metering control signal Y, the injection occurrence signal X and the reset signal R are all periodic in that they are generated at predetermined positions of the pistons of the engine cylinder which receives fuel from the injector 11.

The operation of fuel injection system 10 will now be briefly described with respect to the components illustrated in FIG. 1 and the signal waveforms illustrated in FIG. 4. Essentially, at a time ti prior to a desired time $t_0$ at which fuel injection into the chamber 15 is to occur, the electronic control circuit 12 will actuate the fuel inlet valve 23, via control 24, so as to provide a partial filling of the storage cavity 18. This commences a fuel metering phase where fuel is provided to the cavity 18. The cavity 18, previous to actuation of the fuel inlet valve 23, had a predetermined low reference pressure stored therein. Thus the filling of the storage cavity 18 occurs by effectively connecting the fuel reservoir 14 to the storage cavity via the actuated fuel inlet valve 23 and the fuel pump 14a. This occurs since the fuel pressure provided by pump 14a is greater than the reference pressure in the cavity 18. Filling of the cavity 18 with fuel continues during the pulse duration $T_A$ of signal Y until the time $t_0$ at which time fuel injection is to occur. It should be noted that fuel pump 14a can comprise a conventional low pressure diaphragm-type fuel pump to supply fuel to the cavity 18 via the fuel inlet valve 23.

The electronic control circuit 12 essentially comprises some type of control circuit, such as a microprocessor, which, in response to a sensor signal provided by an engine cylinder piston position sensor 36, calculate when fuel injection should occur and also calculates the amount of fuel to be injected into each cylinder. This calculation of when injection should occur determine the times $t_0$ of the signal Y. The determination of how much fuel should be injected determines the commencement of the pulses 100 which in FIG. 4 is indicated by the times $t_i$. Many types of conventional fuel injector control circuits could be used for the electronic control circuit 12, and typically microprocessors are used to implement such fuel injection control. This general type of fuel control circuit is well known and could be readily provided by minor modifications of prior systems so as to customize the fuel control for various engine conditions such as engine speed, manifold pressure and engine temperature, as well as other engine operating parameters. At the times $t_0$, the fuel inlet valve 23 will close ending the fuel metering phase. Preferably at this same time $t_0$, the signal X will now result in actuating the solenoid air control valve 30 so as to provide compressed air pressure into the cavity 18 via the plunger valve 27. This supply of relatively high pressure compressed air, which pressure exceeds the pressure of the fuel in the cavity 18, is now sufficient to effectively actuate the outlet valve 20 and result in forcing the contents (fuel and air) of the storage cavity 18 into the combustion chamber 15 via the outlet extension 17. This continues until $t_X$ and comprises the fuel injection phase.

During the time $t_i$ to $t_X$, the pressure release valve 32 will remain closed. After termination of the injection phase at the time $t_X$, the electronic control circuit 12 will now provide one of the reset pulses 102 which essentially will open the release valve 32 at $t_X$ and maintain it open shortly after the time $t_X$. During this time the cavity 18 is otherwise sealed since the fuel inlet valve 23 and the solenoid air control valve 30 and plunger valve 27 are now closed. During actuation of the pressure release valve 32, during time durations $T_C$ of the release pulses 102, the cavity 18 will be connected, via conduit 33 and the pressure release valve 32 to the reference (vacuum) pressure reservoir 35 in which a regulated low pressure reference pressure is stored. Thus during the pulse durations $T_C$, occurring between times $t_X$ and $t_R$, the high pressure which existed in the storage cavity 18 by virtue of the compressed air reservoir 13 will be released and replaced with the low reference pressure stored in the reference pressure reservoir 35. This is just to insure that during the next cycle of actuation of the fuel inlet valve 23, this will result in the flowing of fuel from the reservoir 14 into the cavity 18. If a pressure release valve was not provided, then filling the cavity 18 with fuel might have to occur against the 100 PSI air pressure stored in the cavity 18 after actuation and subsequent deactuation of the solenoid air control valve 30. While a specific type of pressure release valve configuration has been illustrated in the present invention, other types of release valves may be utilized. One such variation could merely provide a slow leakage of compressed air from the cavity 18 to ambient as long as this leakage will reduce the pressure in the cavity 18 sufficiently to allow filling of the cavity during the next periodic actuation of the fuel inlet valve 23.

Prior fuel injectors which utilize compressed air for implementing fuel-air injection into a combustion chamber provide beneficial atomization of the fuel which enhances the fuel-air combustion. However, prior fuel injectors did not depend upon the timed actuation of a solenoid controlled fuel inlet valve to determine the amount of fuel to be injected. Instead, prior compressed air fuel injectors altered the size of the fuel storage cavity and depended upon the complete filling of the fuel storage cavity to its selectively-determined, variable volume. This variable volume was determined in accordance with an electronic control circuit signal. This meant that a large number of mechanically movable parts were required to physically alter the size of the fuel storage cavity. In addition, both a fuel inlet valve and a fuel return valve had to be provided and controlled to insure completely filling of the fuel storage cavity to capacity, since otherwise it would be difficult to accurately completely fill the storage cavity to capacity. The addition of such a fuel return valve provides an additional mechanical part which is undesired, and this also requires electronic control of this additional valve.

The present invention, by maintaining a substantially fixed volume fuel storage cavity, and by determining the amount of fuel stored in this cavity in accordance with the timed actuation of the fuel inlet valve 23, eliminates the need for the above-noted additional mechanical parts which were required in prior compressed air fuel injectors. This is achieved while essentially maintaining a two-stage fuel metering and injection process, the first stage comprising the metering of a predetermined amount of fuel into a fixed volume storage cavity so as to partially fill this cavity, and then the use of compressed air to provide a compressed air and fuel mixture to an engine combustion chamber. The use of compressed air provides very fine fuel droplet injection which is less susceptible to carbon or impurity build-up at the nozzle of the injector. While a specific nozzle configuration has not been shown in the outlet extension 17, it is contemplated that a small diameter hole nozzle can be part of extension 17 and be utilized to improve fuel injection distribution. The present use of compressed air for injection also eliminates the requirement, in prior non-compressed air injectors, of an injection plunger assembly which must physically contact the fuel and force the fuel from a storage cavity into the combustion chamber, wherein this occurs by reducing the volume of the storage cavity during injection. The present invention maintains the cavity 18 at a substantially fixed volume during fuel metering and injection. The requirement for a fuel return valve has also been eliminated by the present injector 11. This fuel return valve structure is required when a variable volume fuel storage chamber is utilized and this variable volume chamber is intended for complete filling during a fuel metering phase.

Preferred embodiments for the electronic control circuit 12 will now be discussed in connection with the schematic diagrams shown in FIGS. 2 and 3. However, it should be noted that the improved injector 11 can be utilized with a conventional microprocessor electronic control circuit programmed for fuel injection control. Such prior control circuits, as noted above, are well known in the prior art and, therefore, will not be discussed in detail. These circuits, as was previously noted, essentially utilize an engine cylinder piston position signal, and possibly other signals related to various other engine operating parameters, to produce one or more control signals which determine the amount of fuel to be injected and the time at which the fuel should be injected. The circuit configurations in FIGS. 2 and 3 comprise advantageous fuel injection control circuits which essentially allow a microprocessor to produce a single fuel injector output signal, and then utilize external discrete circuitry to respond to this single control signal to produce the two desired fuel injector control signals X and Y. In addition, external circuitry will then also be utilized to produce the reset signal R. The advantage of this configuration is that critical fuel injection timing information is produced by a single microprocessor output signal, while two other necessary, but related, fuel injection control signals are produced by external circuitry, thus allowing additional output terminals of the microprocessor to be used for other purposes.

Figure 2:
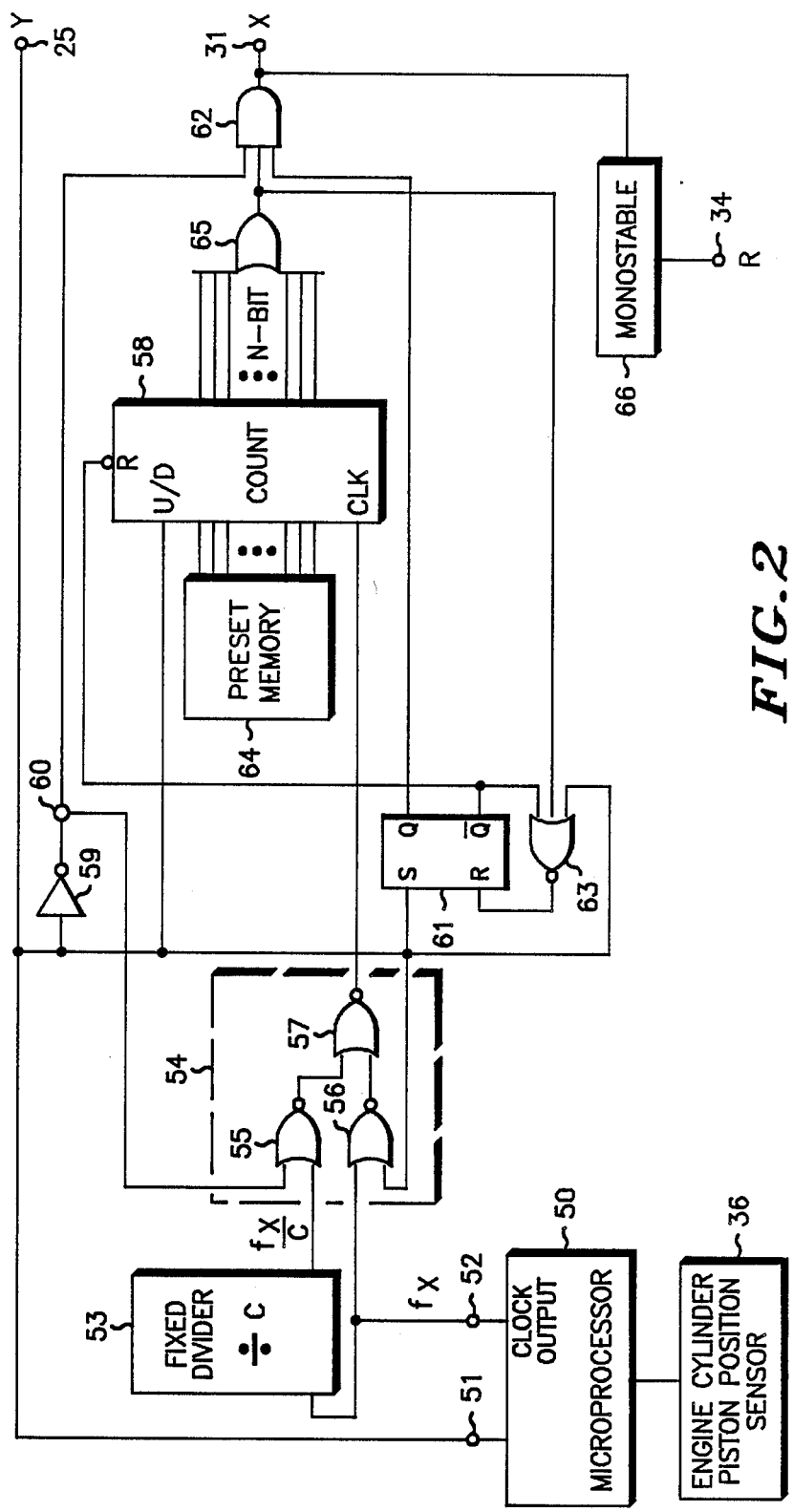
FIG. 2 is an electrical schematic diagram of a fuel injector control circuit for the injection system shown in FIG. 1.

Referring to FIG. 2, a digital embodiment for the electronic control circuit 12 shown in FIG. 1 is illustrated. The control circuit 12 essentially comprises a primary microprocessor 50 which receives cylinder position signals from the engine cylinder piston position sensor 36. In response to these signals, and possibly other signals related to engine parameters, the microprocessor 50 produces at an output port 51 a fuel control output signal comprising the signal Y shown in FIG. 4. This signal comprises the pulses 100 which commence at times $t_i$ and terminate at times $t_0$ wherein the times $t_0$ directly correspond to the times at which fuel injection is to commence. The time duration between $t_i$ and $t_0$, comprising the pulse duration $T_A$, is related to the amount of fuel to be provided to the combustion chamber for each combustion cycle. This relates to the duration during which the solenoid controlled fuel inlet valve 23 will be open. Providing a microprocessor which monitors engine cylinder piston position, by monitoring at least a piston position sensor signal, and which provides a control signal, such as the signal Y, which is related to the amount of fuel desired and which terminates at the time at which fuel is to be injected into the cylinder is well within the capability of the prior art. This essentially amounts to providing the microprocessor 50 with predetermined table look-up charts that determine the amount of fuel needed, and having the microprocessor generate a signal pulse having a duration related to the calculated fuel need. All that remains to be done is to have the microprocessor synchronize the occurrence of the termination of this control signal pulse (100) at a time $t_0$ at which injection is to occur. Substantially all prior fuel injection systems which are microprocessor controlled generally provide a pulse duration related to calculated fuel need. Such systems also calculate the desired initial occurrence of injection, so that synchronizing such a pulse duration is relatively straightforward. Thus having the microprocessor 50 provide the signal Y at the terminal 21 is believed to be readily achievable via known circuit design and microprocessor programming techniques.

In addition to the microprocessor 50 providing the signal Y, the microprocessor also provides a relatively high clock frequency output signal $f_X$ at an output terminal 52. This is connected as an input to a fixed frequency divider 53 that provides a lower frequency signal equal to $f_X$ divided by C as an input to a two-input selector circuit 54 shown dashed in FIG. 2. The other input to this circuit comprises a direct connection to the terminal 52. The selector circuit 54 comprises a NOR gate 55 receiving the signal $f_X$ divided by C and a NOR gate 56 receiving the signal $f_X$. The outputs of the NOR gates are connected as inputs to a NOR gate 57 whose output is connected to a clock inlet terminal CLK of an up/down counter 58. The components 55 through 57 comprise the selector circuit 54. The function of the selector circuit 54 is to provide either the signal $f_X$ or the slower signal $f_X$ divided by C as the clock input to the up/down counter 58.

The signal Y is connected directly as an input to the NOR gate 56 and is connected through an inverter 59 to a terminal 60 which is connected as an input to the NOR gate 55. The signal Y is also connected as an input to the up/down control terminal U/D of the up/down counter 58, as well as connected as an input to set terminal S of a flip-flop 61. The terminal 60 is also connected as an input to an AND gate 62 whose output is connected to the terminal 31 at which the signal X is provided. The signal Y is also connected as an input to a NOR gate 63 having its output connected to a reset terminal R of the flip-flop 61. A non-inverted output terminal Q of the flip-flop 61 is connected as an input to the AND gate 62, and an inverted output terminal $\overline{Q}$ (not Q) is connected as an input to the NOR gate 63 and to a reset terminal R of the up/down counter 58. A preset memory device 64 essentially provides a predetermined preset input to the up/down counter 58 wherein in response to each reset of the counter, the value stored in the preset memory will then become the current count of count registers in the counter 58. The outputs of the counter 58 are all essentially connected in parallel to an OR gate 65 whose output is connected as an input to the AND gate 62 and also to the NOR gate 63. A monostable multivibrator 66 receives an input by virtue of a connection to the terminal 31 and produces the signal R as its output at the terminal 34.

Before discussing in detail the operation of the digital embodiment of the electronic control circuit shown in FIG. 2, it should be noted that there exists a predetermined relationship between the required control signals Y, X and R. The duration $T_A$ of the pulses 100 of the control signal Y relates to the amount of fuel which will be stored in the cavity 18 due to the timed opening of the solenoid controlled fuel inlet valve 23. At the time $t_0$, fuel injection is to commence, and this, of course, occurs at the time the plunger valve 27 is forced open by the compressed air in the reservoir 13 applied to this plunger valve by actuation of the solenoid air control valve 30. Thus the initial time occurrence of the pulses 101 of the injection signal X should correspond, substantially, to the termination of the fuel metering signal pulses 100 at the times $t_0$. In addition, the duration $T_B$ of the injection occurrence signal pulses 101 is also related to the amount of fuel (and air) that was stored in the fixed volume cavity 18 prior to commencement of the injection mode. This is because applying air pressure to the fuel in the cavity 18 at a regulated air pressure of 100 PSI will result in predetermined rates of fuel and then air being passed through the outlet extension 17 to the combustion chamber 15. The termination of the injection signal at the time $t_X$ should occur when all of the fuel in the cavity 18, and a desired amount of air, has been passed through the outlet extension 17. This time is thus related to the amount of actual fuel which was present in the cavity 18 which is related to the duration $T_A$. Thus clearly the signal X can be determined based upon the signal Y since the duration $T_B$ will vary in proportion to the duration $T_A$, plus a constant to take into account the opening and closing times of the valves 23 and 27. The commencement of the signal X pulses 100 should substantially correspond to the termination of the pulses of the signal Y at the times $t_0$.

The digital electronic control circuit shown in FIG. 2 will accurately implement the signal X in response to the receipt of the signal Y, and therefore eliminate requiring the microprocessor 50 to provide both the signals X and Y. This, as was previously noted, provides a substantial benefit in that now more outputs of the microprocessor can be utilized for producing other engine control functions since the number of fuel injection control outputs provided by the microprocessor has been minimized. The operation of the digital electronic control circuit in FIG. 2 will now be discussed in detail.

The microprocessor 50 can comprise a conventional microprocessor such as the Motorola 68HC11 which already provides a high frequency constant clock output signal suitable for the signal $f_X$. Programming of such a microprocessor can also readily be implemented so as to produce the desired fuel signal Y in accordance with engine cylinder piston position. When the signal Y attains a high or 1 logic state, the Q output of the flip-flop 61 is set to a logic 1 and the not Q output is set to logic 0. This results in taking the up/down counter 58 out of its reset mode and therefore allows this counter to implement counting from an initial count value determined by the preset memory device 64. The signal Y having a logic 1 state also results in setting the counter 58 to upcounting, and results in the selector circuit 54 passing the high clock frequency $f_X$ divided by C as the input signal to the clock terminal CLK of the counter 58. Until the fuel metering signal Y has a low logic state, the counter 58 will continue to upcount at the relatively slow rate of $f_X$ divided by C. When the fuel metering signal Y attains a low (0) logic state, the three-input AND gate 62 will produce a high logic state output corresponding to a high logic state of the signal X. Also, the counter 58 will now be switched from upcounting to downcounting, and the clock terminal of the counter will now receive the high clock frequency $f_X$ as its input.

The fuel injection signal X will stay at a high logic state and the counter 58 will continue to count down until this counter reaches a zero count. When this occurs, the OR gate 65 will produce a low output signal causing the fuel injection signal X to achieve a low logic state. This occurrence also results in resetting the flip-flop 61 and setting the stage for the next occurrence of a fuel metering pulse 100 of the signal Y.

In the upcounting sequence of the counter 58, the clock rate is equal to the signal $f_X$ divided by C. The maximum count of the counter 58 during the upcounting phase is related to the pulse duration $T_A$ of the signal Y. Since the pulse duration $T_B$ of the signal X is related to the time it takes for the counter 58 to count down to zero from this maximum count, it is apparent that the divide by constant C implemented by the fixed divider 53 determines the proportional relationship between $T_A$ and $T_B$. In addition, the preset count to which the counter 58 is preset after the bringing the counter out of its reset mode comprises a constant K which also determines the relationship between $T_A$ and $T_B$. It can be seen, therefore, that the following relationship exists between the duration $T_A$ of the fuel metering pulses 100 of the signal Y and the duration $T_B$ of the fuel injection occurrence pulses 101 of the signal X:

$T_B = (T_A) \cdot (1/C) + K$, is determined by the preset memory count provided by the memory device 64, and C is determined by the divide by relationship implemented by the divider 53.

It should be noted that the signal R, for implementing a resetting of the pressure inside the cavity 18 prior to the next sequential filling of this cavity with fuel, can be readily implemented by the monostable multivibrator 66 just providing the reset pulses 102 in response to termination of the high logic state of the signal X at the times $t_x$. The circuit in FIG. 2 implements this function, also without requiring any additional output signal, except signal Y, from the microprocessor 50.

Figure 3:
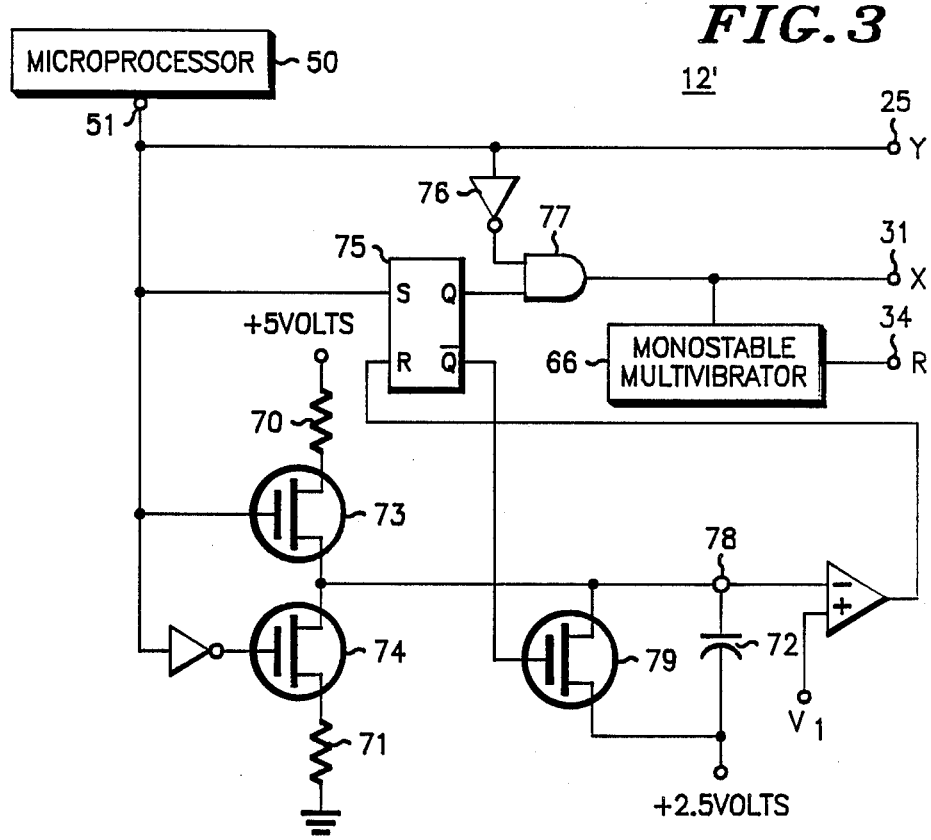
FIG. 3 is an electrical schematic diagram of an alternate embodiment of the fuel injector control circuit shown in FIG. 2.

Referring now to FIG. 3, a partial analog equivalent circuit 12' of the digital embodiment shown in FIG. 2 is illustrated. Circuitry and signals in FIG. 3 which are identical to corresponding circuitry and signals in FIG. 2 are designated by identical reference numbers. For the circuit 12' in FIG. 3, again the microprocessor 50 produces the signal Y, and additional external circuitry responds to the signal Y so as to produce the signal X at the terminal 31 while the monostable multivibrator 66 responds to the signal X to produce the signal R at the terminal 34. Essentially, the ratio relationship between the pulse widths $T_A$ and $T_B$ is determined by the circuit in FIG. 3 by virtue of the ratio of resistors 70 and 71. In FIG. 3, a reference voltage $V_1$ essentially implements the fixed constant difference between the signals X and Y implemented in FIG. 2 by the preset count provided by the preset memory device 64.

Essentially, when the fuel metering signal Y attains a high logic state, an integrating capacitor 72 will be charged through the resistor 70 by virtue of the signal Y closing an effective switch 73 (shown in FIG. 3 as a FET). When the signal Y has a low logic state, a similar switch 74 discharges the capacitor 72 to ground potential through the resistor 71. The fuel injection occurrence signal X will be set to a high logic state in response to the termination of a previous high logic state of the signal Y because of a flip-flop circuit 75 nd an inverter 76 and AND gate 77. The injection occurrence signal X will remain high until the resetting of the flip-flop 75 which occurs when the voltage at a terminal 78 of the capacitor 72 falls below the reference voltage $V_1$. The resetting of the flip-flop 75 also insures a zero charge across the capacitor 72 by virtue of a controllable electrical switch 79 (similar to switches 73 and 74) controlled by an output of the flip-flop 75.

It should be noted that the digital embodiment in FIG. 2 and the analog embodiment in FIG. 3 essentially allow a microprocessor to produce a single fuel injection control signal Y which has information relating to the amount of fuel to be injected (the durations $T_A$ of the pulses 100) and the times at which injection should occur (the time occurrences $t_0$). The microprocessor created control signal Y is then processed by circuitry separate and external from the microprocessor to produce the separate fuel injection occurrence signal X which is then utilized by the fuel injector 11 in FIG. 1. The circuit configurations in FIGS. 2 and 3 thus eliminate the requirement that the microprocessor produce both of the signals X and Y. This minimizes the number of outputs required of the microprocessor 50 for fuel injection control.

While specific embodiments of the present invention have been shown and described, further modifications and improvements will occur to those skilled in the art. All such modifications which retain the basic underlying principles disclosed and claimed herein are within the scope of this invention.

We claim:

1. A fuel injector comprising:
   a body having a fixed volume receiving cavity with an outlet valve, said outlet valve adaptable to selectively inject the contents in said cavity into an engine combustion chamber;
   a fuel inlet valve means connected to said cavity for periodically providing fuel thereto in accordance with a received fuel metering electrical control signal, comprising periodic pulses, said fuel metering control signal controlling actuation of said fuel inlet valve means, and the effective duration of said fuel metering control signal pulses controlling the amount of fuel provided to said cavity; and
   a compressed air inlet valve means connected to said cavity for periodically providing compressed air to said cavity in accordance with a received injection occurrence electrical control signal, separate from said fuel metering signal, said injection occurrence control signal comprising periodic pulses which control actuation of said compressed air inlet valve means and control at least the initial time of occurrence of injection of the contents of said cavity, comprising fuel and air, through said outlet valve and into said combustion chamber.

2. A fuel injector according to claim 1 wherein said cavity and said outlet valve are substantially closed during actuation of said fuel inlet valve means such that all fuel provided to said cavity during said fuel metering electrical control signal pulses remains in said cavity until injection via said outlet valve, at which time the fuel in said cavity is forced through said outlet valve.

3. A fuel injector according to claim 2 wherein said compressed air provided to said cavity via said compressed air inlet valve means pressurizes said cavity at at least a first pressure, said first pressure actuating said outlet valve to initiate fuel injection.

4. A fuel injector according to claim 3 which includes a pressure release valve means connected to said cavity for providing, in response to a received electrical release signal, a predetermined reference pressure in said cavity after injection of the contents in said cavity via said outlet valve.

5. A fuel injector according to claim 4 wherein said first pressure exceeds said predetermined reference pressure provided by said pressure release valve means, and wherein said outlet valve is closed (nonactuated) when pressure in said cavity is at said predetermined reference pressure.

6. A fuel injection control circuit comprising:
   means for developing a fuel metering electrical control signal comprising periodic pulses having pulse durations determining the amount of fuel to be stored in a storage cavity of a fuel injector; and
   means for developing a fuel injection occurrence electrical control signal, separate from said fuel metering electrical control signal, comprising periodic pulses corresponding to said fuel metering electrical control signal pulses, each of said fuel injection occurrence control signal pulses having an initial time occurrence determining the initial occurrence of injection of the contents in said injector storage cavity into a combustion chamber;
   wherein said fuel injection occurrence control signal developing means is separate from and coupled to said fuel metering electrical control signal developing means and receives said fuel metering electrical control signal and determines said fuel injection occurrence electrical control signal in accordance therewith.

7. A fuel injection control circuit according to claim 6 wherein the duration of each of said fuel metering electrical control signal pulses determines the duration of a corresponding fuel injection occurrence electrical control pulse produced in response thereto.

8. A fuel injection control circuit according to claim 7 wherein the time occurrence of each of said fuel metering electrical control pulses determines the time of occurrence of each of said corresponding fuel injection occurrence electrical control pulses produced in response thereto.

9. A fuel injection control circuit according to claim 8 wherein said fuel metering electrical control signal developing means comprises a microprocessor which provides said fuel metering control signal as one of its output signals, and wherein said fuel injection occurrence electrical control signal developing means is separate from said microprocessor and comprises circuitry external to said microprocessor.

10. A fuel injection control circuit according to claim 9 wherein said fuel injection occurrence control signal developing means initiates one of said fuel injection occurrence pulses in response to the termination of each of said fuel metering control pulses.

11. A fuel injection system comprising:
a fuel injector comprising a body having a fixed volume receiving cavity with an outlet valve, said outlet valve adaptable to selectively inject the contents in said cavity into an engine combustion chamber;
a fuel inlet valve means connected to said cavity for periodically providing fuel thereto in accordance with a received fuel metering electrical control signal, comprising periodic pulses, said fuel metering control signal controlling actuation of said fuel inlet valve, and the effective duration of said fuel metering control signal pulses controlling the amount of fuel provided to said cavity; and
a compressed air inlet valve means connected to said cavity for periodically providing compressed air to said cavity in accordance with a received injection occurrence control signal, separate from said fuel metering signal, said injection occurrence control signal comprising periodic pulses which control actuation of said compressed air inlet valve means and control at least the initial time of occurrence of injection of the contents of said cavity, comprising fuel and air, through said outlet valve and into said combustion chamber; and
a fuel injection control circuit comprising:
means for developing said fuel metering electrical control signal pulses; and
means for developing said fuel injection occurrence electrical control signal pulses, corresponding to said fuel metering control signal pulses, each of said fuel injection occurrence control signal pulses having an initial time occurrence determining the initial occurrence of injection of the contents in said cavity into a combustion chamber;
wherein said fuel injection occurrence control signal developing means is separate from and coupled to said fuel metering control signal developing means and receives said fuel metering control signal and determines said fuel injection occurrence control signal in accordance therewith.

12. A fuel injection system according to claim 11 which includes a low pressure fuel pump coupled between said fuel inlet valve means and a fuel reservoir.

13. A fuel injection system according to claim 11 wherein the duration of each of said fuel metering electrical control signal pulses determines the duration of a corresponding fuel injection occurrence electrical control pulse produced in response thereto.

14. A fuel injection system according to claim 13 wherein the time occurrence of each of said fuel metering electrical control pulses determines the time of occurrence of each of said corresponding fuel injection occurrence electrical control pulses produced in response thereto.

15. A fuel injection system according to claim 14 wherein said fuel metering electrical control signal developing means comprises a microprocessor which provides said fuel metering control signal as one of its output signals, and wherein said fuel injection occurrence electrical control signal developing means is separate from said microprocessor and comprises circuitry external to said microprocessor.

16. A fuel injection system according to claim 15 wherein said fuel injection occurrence control signal developing means initiates one of said fuel injection occurrence pulses in response to the termination of each of said fuel metering control pulses.

17. A fuel injection system according to claim 16 wherein said cavity and said outlet valve are substantially closed during actuation of said fuel inlet valve means such that all fuel provided to said cavity during said fuel metering electrical control signal pulses remains in said cavity until injection via said outlet valve, at which time the fuel in said cavity is forced through said outlet valve.

18. A fuel injection system according to claim 17 wherein said compressed air provided to said cavity via said compressed air inlet valve means pressurizes said cavity at at least a first pressure, said first pressure actuating said outlet valve to initiate fuel injection.

19. A fuel injection system according to claim 18 which includes a pressure release valve means connected to said cavity for providing, in response to a received electrical release signal, a predetermined reference pressure in said cavity after injection of the contents in said cavity via said outlet valve.

20. A fuel injection system according to claim 19 wherein said first pressure exceeds said predetermined reference pressure provided by said pressure release valve means, and wherein said outlet valve is closed (nonactuated) when pressure in said cavity is at said predetermined reference pressure

* * * * *